United States Patent [19]

Meier

[11] 4,116,842
[45] Sep. 26, 1978

[54] FILTER ELEMENT FOR DISC-TYPE FILTER

[75] Inventor: Hanspeter Meier, Rapperswil, Switzerland

[73] Assignee: Dr. Ing. Hans Mueller, Maennedorf, Switzerland

[21] Appl. No.: 842,924

[22] Filed: Oct. 17, 1977

Related U.S. Application Data

[63] Continuation of Ser. No. 701,991, Jul. 1, 1976, abandoned.

[30] Foreign Application Priority Data

Jul. 3, 1975 [CH] Switzerland .......................... 8803/75

[51] Int. Cl.² ............................................ B01D 33/26
[52] U.S. Cl. .................... 210/330; 210/332; 210/344
[58] Field of Search ................................ 210/330–334, 210/344, 411, 492, 224

[56] References Cited

U.S. PATENT DOCUMENTS

| | | | |
|---|---|---|---|
| 2,452,486 | 10/1948 | O'Meara | 210/344 |
| 2,687,217 | 8/1954 | Kracklauer | 210/344 |
| 3,142,642 | 7/1964 | Kracklauer | 210/344 X |
| 3,343,681 | 9/1967 | Madden | 210/344 X |
| 3,490,595 | 1/1970 | Krynski et al. | 210/344 X |
| 3,948,778 | 4/1976 | Muller | 210/344 |
| 3,985,656 | 10/1976 | Aryanitakis | 210/334 X |

*Primary Examiner*—William A. Cuchlinski, Jr.
*Attorney, Agent, or Firm*—Michael J. Striker

[57] ABSTRACT

A filtering apparatus comprises a housing defining a generally closed chamber in which is provided a hollow rotatable shaft that carries a plurality of filter elements. Each of these elements is formed as an upwardly dished fluid-impervious metal plate formed with a central hole through which the hollow shaft passes and having a concave upper face formed with an array of spaced-apart bosses. A fluid-pervious filter cloth lies on the plate directly against the bosses so as to be spaced from the plate between the bosses. A ring secured to the smooth edge of each plate secures the respective filter cloth in place.

10 Claims, 5 Drawing Figures

FILTER ELEMENT FOR DISC-TYPE FILTER

This is a continuation, of application Ser. No. 701,991, filed July 1, 1976 now abandoned.

BACKGROUND OF THE INVENTION

The present invention relates to a filtering apparatus. More particularly this invention concerns a filter element for a disc-type filter apparatus.

A filtering apparatus is known having a housing defining a generally closed chamber to which is fed a filtrant fluid. A hollow shaft is rotatable in the chamber and carries a plurality of filter plates. Each of these plates is constituted as a metal plate and, spaced slightly from the plate, a filter cloth. The space between the filter cloth and the plate communicates via radial apertures with the interior of the hollow shaft which in turn is connected to the input of a pump. During filtering the pump, therefore, can pump the fluid through the cloth so as to filter from this filtrant fluid any particles, leaving them deposited on the cloth. Once a substantial filter cake has built up it is possible to rinse off the filter cloth by rotating the shaft while spraying against the cake on the cloth jets of water of the like. During such rinsing operation the sluicedaway filter cake may exit through a waste port at the bottom of the housing.

In all such installations there is provided between the metal filter-element plate and the cloth a screen or the like which serves to space this cloth from the plate so as to define an aspiration compartment. It is known to form the surface of the plate with corrugations or the like, but always there is provided a screen or perforated metal plate which lies underneath the filter cloth and prevents it from conforming in shape to the metal plate.

The provision of an extra support screen or the like increases the cost of the apparatus. Furthermore it increases the bulk of each of the filter elements so that fewer elements can be held in the same housing.

Various prior-art filters can be seen in Swiss Pat. Nos. 346,862 and 357,056 as well as in U.S. Pat. Nos. 2,687,217, 3,141,845, 3,142,642 and 3,033,373.

SUMMARY OF THE INVENTION

It is an object of the present invention to provide an improved filter apparatus.

Another object is the provision of a filter element for such an apparatus which is simpler in design and, hence, cheaper to manufacture than the above-described filter elements.

These objects are attained according to the present invention in a filter element for a disc filter of the above-described general type but wherein a dished fluid-impervious metal plate is formed with a central hole and has a concave face formed with an array of spaced-apart bosses. A fluid-impervious filter cloth lies on the plate directly against the bosses so as to be spaced from the plate by the bosses. Means is provided for securing this cloth to the concave face, such means typically comprising a ring screwed over the cloth to the smooth rim of the plate which surrounds the array of bosses.

In accordance with another feature of this invention the bosses are integral with the plate and are spaced apart at the face of the plate carrying them by at most 5 mm. Thus the plate is of uniform thickness and the bosses are formed by stamping or a like operation. According to this invention the bosses are spaced apart at the face by between 1.5 and 2.5 mm. This close spacing prevents the filter cloth from conforming to the shape of the face between the bosses so that it will bridge between the bosses and form the aspiration compartment of the filter.

According to further features of this invention the bosses are rounded away from the face or are of polygonal shape. The plate is made of alloyed steel for maximum strength and durability.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 5:
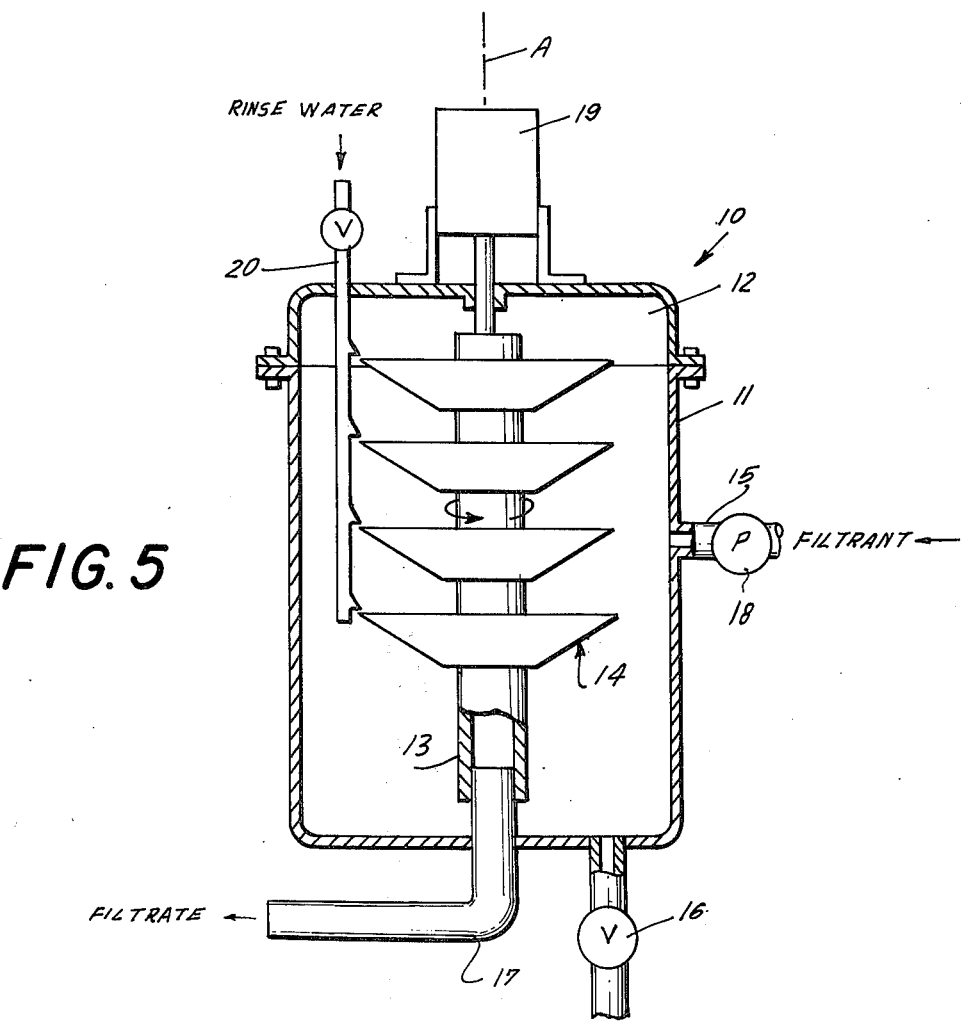
FIG. 5 is a vertical sectional view partly in diagrammatic form illustrating a filter apparatus embodying the filter elements according to this invention.

With reference first to FIG. 5, a filter apparatus has a housing 11 defining a closed interior chamber 12 in which a hollow rotatable shaft 13 defines an axis A. Carried on this shaft 13 are a plurality of filter elements 14 as will be described below.

A filtrant, that is a particle-carrying liquid to be filtered, can be admitted to the housing through an inlet nipple 15. The housing 11 is also provided with a valve-controlled drain 16. Liquid can be pumped through the interior of the hollow conduit 13 by means of a pipe 17. A motor 19 may rotate the shaft 13 and the elements 14 about the axis A. In addition rinse water may be introduced through a sprayer pipe 20 and directed in jets against the top of each of the upwardly dished elements 14.

During use of the apparatus as a standard filter the motor 19 is not energized so that the filter elements 14 are all stationary. A filtrant is fed in through the inlet 15 by the pump 18 and a filtrate is leaving the housing 11 by a pipe 17. The particles carried by the filtrant liquid are deposited on the upper surfaces of the filter elements 14.

For rinsing of filter cake off the elements 14 the feeding-in of filtrant is stopped and the pump 18 is similarly not operated. The motor 19 is then switched on and the valve at the outlet 16 opened. Water is fed under pressure to the conduit 20 so as to be sprayed on the rotating filter elements 14. The cake is sluiced off these elements 14 and washed out of the housing through the outlet 16.

Figure 1:
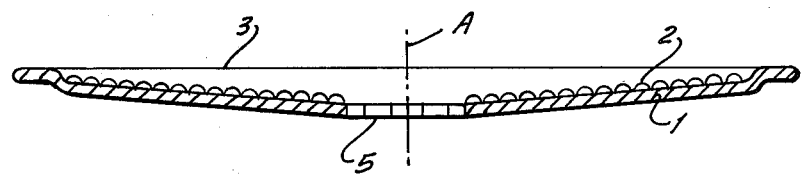
FIG. 1 is an axial section through a filter-element plate according to this invention.
Figure 2:
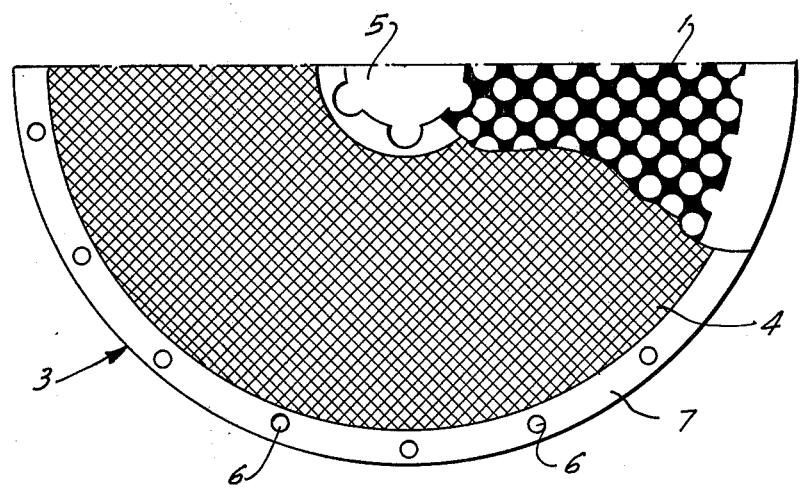
FIG. 2 is a top view partly broken away showing the filter element according to the present invention.
Figure 3:
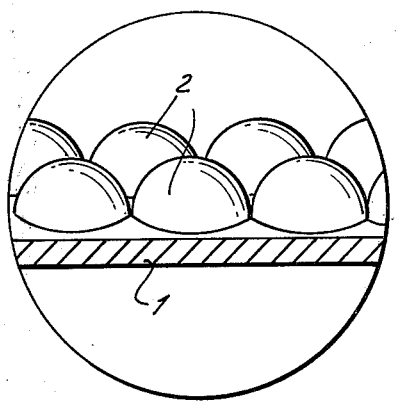
FIG. 3 is a large-scale perspective view of a detail of the filter plate of FIG. 1.

FIGS. 1 and 2 show how the filter element comprises a filter plate 1 of frustoconical and upwardly dished shape centered on the axis A and formed with a central throughgoing hole 5. This plate 1 has on its upper surface a multiplicity of rounded bosses 2 as shown in FIG. 1. The bosses 2 are spaced apart in a uniform array between the hole 5 and a smooth rim 3 of the dished plate 1.

A ring 7 may be secured by screws 6 to this rim 1 to clamp an annular filter cloth 4 to the upper surface of the plate 1. This filter cloth 4 will therefore lie directly against the bosses 2 so that the filtrate can be aspirated from the space between the plate 1 and the cloth 4. A ring 7 also may be secured in the manner as described in the U.S. Pat. No. 3,033,373.

Figure 4:
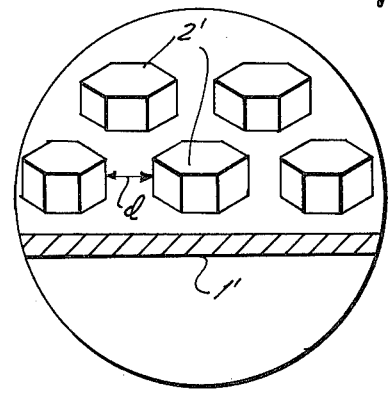
FIG. 4 is a view similar to FIG. 3 illustrating another type of filter plate in accordance with this invention.

As shown in FIG. 4 it is also possible to provide a plate 1' with a polygonal, here hexagonal, bosses 2'. These bosses are spaced apart by a distance $d = 2.0$ mm.

The plate 1 is made of alloy steel for maximum strength and longer service life. Since with this arrangement it is not necessary to provide a separating screen between the plate 1 and the cloth 4 it is possible to produce the filter element 14 at extremely low cost. Furthermore since the element 14 is relatively thin, not having a filter screen, it is possible to provide more such filter elements in a given filter housing 11 than is normally possible.

It will be understood that each of the elements described above, or two or more together, may also find a useful application in other types of structures, differing from the types described above.

While the invention has been illustrated and described as embodied in a filter element, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A filter element for a centrifugal disc filter, said element comprising a dished fluid-imprevious metal plate formed with a central hole and having a concave face formed with a plurality of spaced-apart bosses, said bosses being uniformly interspersed over said face of said plate from said central hole to the outer periphery of said plate; a fluid-pervious filter cloth having one surface onto which a filtrant is to be fed and another surface spaced from said one surface and lying on said plate directly on said bosses following the concave contour of said plate so as to define a space between said plate and said filter cloth around said bosses, said bosses being located in such a close relationship relative to one another that when the filtrant is fed onto said one surface of said filter cloth the latter is supported upon and bridges the space between adjacent ones of said bosses and is thereby prevented from conforming to the shape of said plate so as to maintain said space unobstructed to permit the flow of filtrate therein; and means for securing said cloth to said concave face.

2. The element defined in claim 1, wherein said plate is generally frustoconical and said means includes a ring securable over said cloth with the outer periphery of said plate.

3. The element defined in claim 1, wherein said bosses are spaced apart at said face by between 1.5 mm and 2.5 mm.

4. The element defined in claim 1, wherein said bosses are rounded away from said face.

5. The element defined in claim 1, wherein said plate is made of alloyed steel.

6. The element defined in claim 1, wherein said plate has a smooth rim, said ring being secured to said rim around said plurality of said bosses.

7. The element defined in claim 1, wherein said bosses are polygonal and each has at least six angles.

8. A centrifugal filtering apparatus comprising a housing defining a generally closed chamber; a rotatable hollow shaft extending into said chamber; a metal plate in said chamber mounted on said rotatable hollow shaft and having a surface integrally formed with an array of projecting spaced-apart bosses; a filter cloth having one surface onto which a filtrant fluid is to be fed and another surface spaced from said one surface and lying directly on said bosses following the surface of said plate so as to define a space between said plate and said filter cloth around said bosses communicating with a hollow of said shaft, said bosses being located in such a close relationship relative to one another that when the filtrant fluid is fed onto said one surface of said filter cloth the latter is supported upon and bridges the space between adjacent ones of said bosses and is thereby prevented from conforming to the shape of said plate so as to maintain said space unobstructed to permit the flow of filtrate therein; means for feeding the filtrant fluid to said chamber and onto said filter cloth; means for pumping fluid through said space, whereby said filtrant fluid is filtered through said cloth and thereafter through said hollow of said shaft; and means for rotating said hollow shaft together with said metal plate and said filter cloth so as to centrifugally remove a filter cake deposited on the filter cloth.

9. The apparatus defined in claim 8, wherein said plate is generally frustoconical and said bosses are spaced apart at said surface by between 1.5 mm and 2.5 mm, said plate having around said array a smooth rim, said apparatus further comprising a ring secured to said plate at said rim over said cloth.

10. The apparatus as defined in claim 9, further comprises means for directing water against said filter cloth during rotation of the same together with said metal plate and said hollow shaft so as to rinse said filter cloth.

* * * * *